United States Patent
Kim et al.

(10) Patent No.: US 9,794,037 B2
(45) Date of Patent: Oct. 17, 2017

(54) METHOD OF TRANSMITTING A REFERENCE SIGNAL FROM A BASE STATION TO A USER EQUIPMENT IN A WIRELESS COMMUNICATION SYSTEM AND APPARATUS THEREFOR

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 38 days.

(21) Appl. No.: 14/767,075

(22) PCT Filed: Aug. 20, 2013

(86) PCT No.: PCT/KR2013/007451
§ 371 (c)(1),
(2) Date: Aug. 11, 2015

(87) PCT Pub. No.: WO2014/126311
PCT Pub. Date: Aug. 21, 2014

(65) Prior Publication Data
US 2015/0381331 A1    Dec. 31, 2015

Related U.S. Application Data

(60) Provisional application No. 61/763,904, filed on Feb. 12, 2013.

(51) Int. Cl.
*H04L 5/00* (2006.01)
*H04W 88/08* (2009.01)

(52) U.S. Cl.
CPC ............ *H04L 5/0048* (2013.01); *H04L 5/006* (2013.01); *H04L 5/0023* (2013.01);
(Continued)

(58) Field of Classification Search
None
See application file for complete search history.

(56) References Cited

U.S. PATENT DOCUMENTS

2007/0082692 A1* 4/2007 Tirkkonen ............ H04L 5/0023
455/522
2007/0104174 A1   5/2007 Nystrom et al.
(Continued)

FOREIGN PATENT DOCUMENTS

JP   2006-510315   3/2006
JP   2008-187682   8/2008
(Continued)

OTHER PUBLICATIONS

European Patent Office Application Serial No. 13874997.3, Search Report dated Aug. 8, 2016, 8 pages.
(Continued)

*Primary Examiner* — Andrew Lai
*Assistant Examiner* — Jamaal Henson
(74) *Attorney, Agent, or Firm* — Lee Hong Degerman Kang Waimey

(57) ABSTRACT

A method of transmitting a reference signal from a base station to a user equipment in a wireless communication system and apparatus therefor are disclosed. The present invention includes dividing a system band into at least one or more partial bands, configuring a time-axis high density reference signal on a high frequency partial band with reference to a center frequency of the system band, configuring a time-axis low density reference signal on a low frequency partial band with reference to the center frequency, and transmitting the configured reference signals to the user equipment.

8 Claims, 14 Drawing Sheets

(52) U.S. Cl.
CPC .......... *H04L 5/0007* (2013.01); *H04L 5/0082* (2013.01); *H04L 5/0085* (2013.01); *H04W 88/08* (2013.01)

(56) References Cited

U.S. PATENT DOCUMENTS

| | | | | |
|---|---|---|---|---|
| 2009/0175370 A1* | 7/2009 | Kuroda | ................... | H04L 5/005 375/260 |
| 2011/0134879 A1 | 6/2011 | Ogawa et al. | | |
| 2011/0305185 A1* | 12/2011 | Kwon | ................... | H04L 5/0007 370/312 |
| 2013/0003788 A1* | 1/2013 | Marinier | ................ | H04B 7/024 375/219 |

FOREIGN PATENT DOCUMENTS

| | | |
|---|---|---|
| JP | 2008-288736 | 11/2008 |
| KR | 10-2010-0117666 | 11/2010 |

OTHER PUBLICATIONS

Ericsson, "E-UTRA Downlink Radio Access," TSG-RAN WG1 Ad Hoc on LTE, R1-050619, Jun. 2005, 5 pages.
PCT International Application No. PCT/KR2013/007451, Written Opinion of the International Searching Authority dated Nov. 25, 2013, 11 pages.

\* cited by examiner

FIG. 2
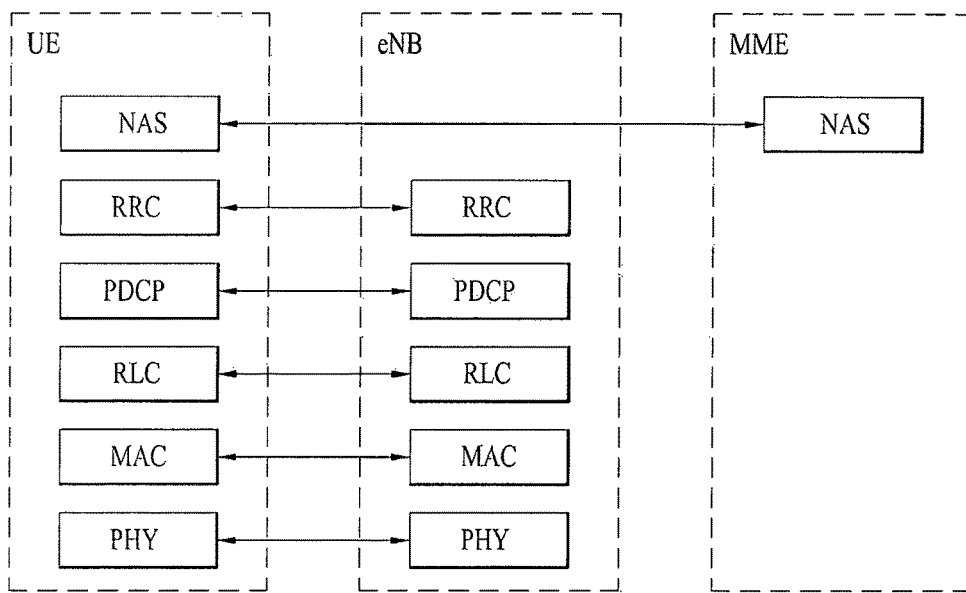
(a) Control-plane protocol stack
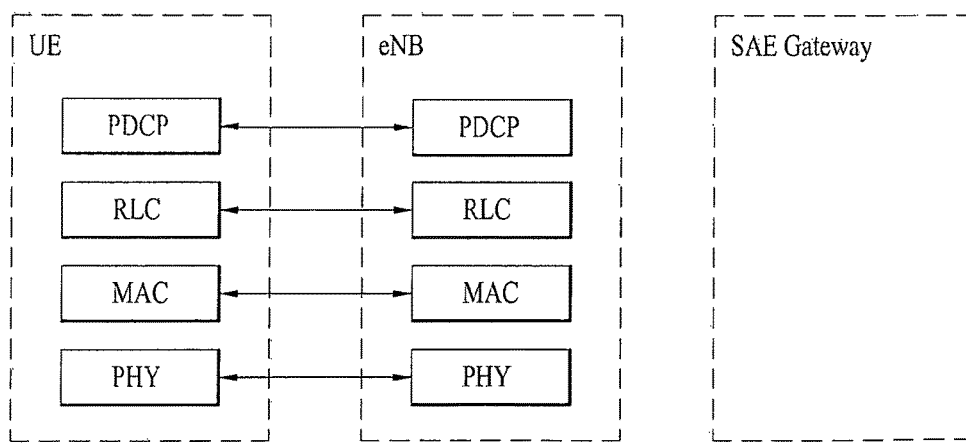
(b) User-plane protocol stack

METHOD OF TRANSMITTING A REFERENCE SIGNAL FROM A BASE STATION TO A USER EQUIPMENT IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/007451, filed on Aug. 20, 2013, which claims the benefit of U.S. Provisional Application No. 61/763,904, filed on Feb. 12, 2013, the contents of which are all hereby incorporated by reference herein in their entirety.

TECHNICAL FIELD

The present invention relates to a wireless communication system, and more particularly, to a method of transmitting a reference signal from a base station to a user equipment in a wireless communication system and apparatus therefor.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called. LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Technical Problem

Based on the above-mentioned discussion, a method of transmitting a reference signal from a base station to a user equipment in a wireless communication system and apparatus therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting a reference signal, which is transmitted by a base station to a user equipment in a wireless communication system, according to one embodiment of the present invention includes the steps of dividing a system band into at least one or more partial bands, configuring a time-axis high density reference signal on a high frequency partial band with reference to a center frequency of the system band, configuring a time-axis low density reference signal on a low frequency partial band with reference to the center frequency, and transmitting the configured reference signals to the user equipment.

Preferably, the method may further include the steps of configuring different time-axis density reference signals for subframes included in a system frame and transmitting subframe configuration information including information on the different time-axis density reference signals to the user equipment. In this case, the subframe configuration information may be defined as a bitmap by unit of the system frame including a predetermined number of subframes.

To further achieve these and other advantages and in accordance with the purpose of the present invention, a base in a wireless communication system according to another embodiment of the present invention includes a processor for dividing a system band into at least one or more partial bands, for configuring a time-axis high density reference signal on a high frequency partial band with reference to a center frequency of the system band, and for configuring a time-axis low density reference signal on a low frequency partial band with reference to the center frequency and a transmitting module for transmitting the configured reference signals to a user equipment.

Preferably, the processor may configure different time-axis density reference signals for subframes included in a system frame and the processor may control the transmitting module to transmit subframe configuration information including information on the different time-axis density reference signals to the user equipment.

More preferably, if a high-speed user equipment and a low-speed user equipment coexist in a coverage, the processor may configure the time-axis high density reference signal and the time-axis low density reference signal on the high frequency partial band and the low frequency partial band, respectively. Moreover, if the low-speed user equipment exists in the coverage, the processor may configure the time-axis low density reference signal across the system band.

More preferably, the system frame may include a 1st subframe type having both the time-axis high density reference signal and the time-axis low density reference signal and a 2nd subframe type having the time-axis low density reference signal only. Furthermore, a frequency-axis density of the time-axis high density reference signal may be equal to that of the time-axis low density reference signal.

The above-mentioned general description of the present invention and the following details of the present invention are exemplary and may be provided for the additional description of the invention disclosed in claims.

Advantageous Effects

Accordingly, the present invention may provide the following effects and/or features.

First of all, according to an embodiment of the present invention, a base station in a wireless communication system can perform a reference signal transmission appropriate for channel properties in a manner of configuring a reference signal density or pattern differing on each frequency band.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on 3GPP radio access network specification.

BEST MODE

Figure 1:
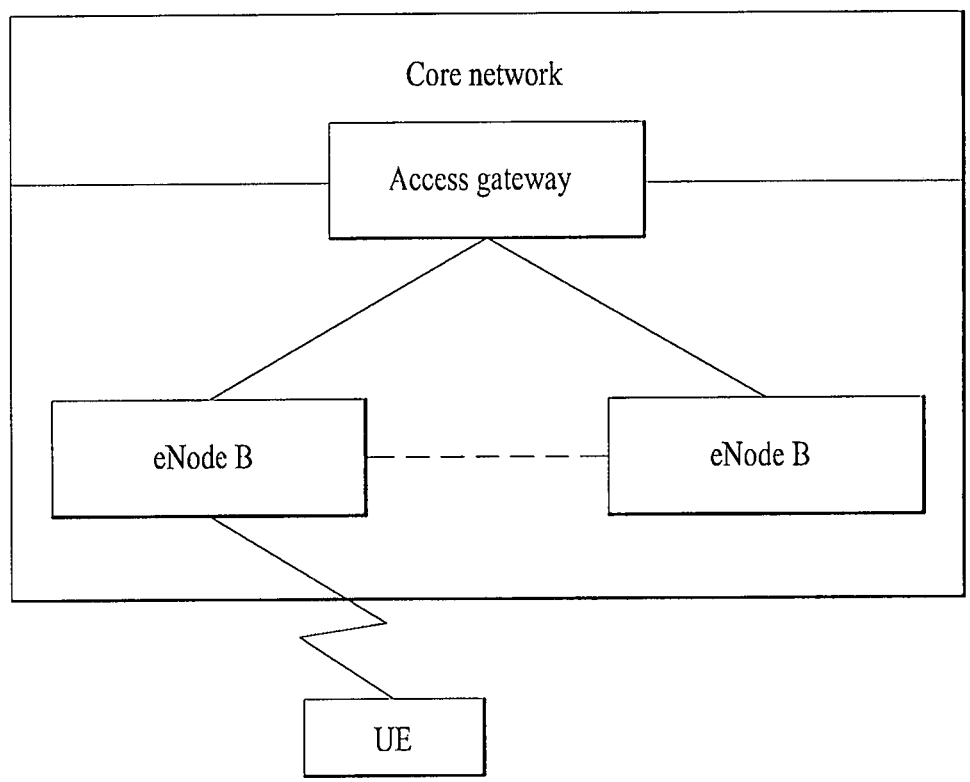
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated. RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
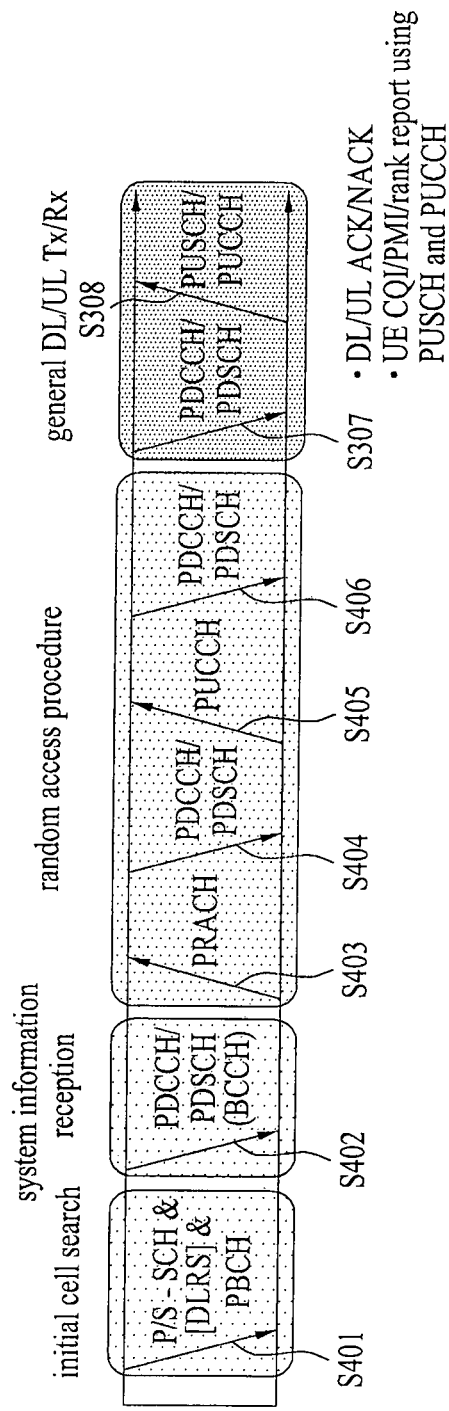
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

In the following description, MIMO system is explained. First of all, MIMO (multi-input multi-output) is a method that uses a plurality of transmitting antennas and a plurality of receiving antennas. And, this method may be able to improve efficiency in transceiving data. En particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 4:
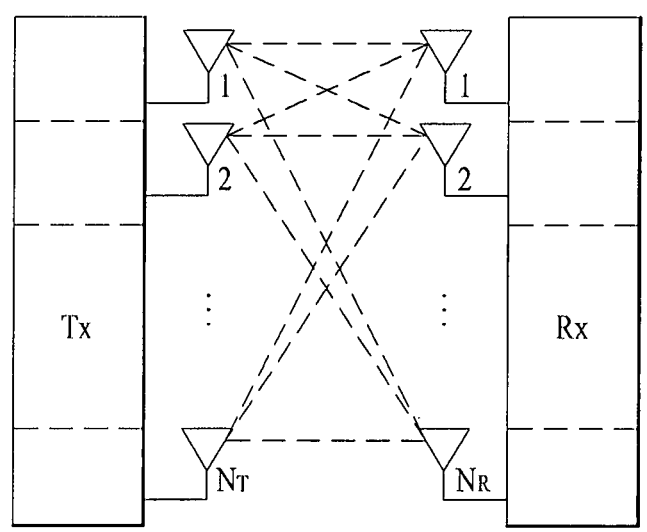
FIG. 4 is a diagram for a configuration of a general multi-antenna (MIMO) communication system.

FIG. 4 is a diagram for a configuration of a multi-antenna (MIMO) communication system explained in the description of the present invention. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 4, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \quad \text{[Formula 2]}$$

Meanwhile, transmission powers can be set different from each other for transmission informations $s_2, s_2, \ldots, s_{N_T}$, respectively. If the transmission powers are set to $P_1, P_2, \ldots, P_{N_T}$ respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_s, \ldots, P_{N_T} s_{N_T}]^T \quad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \quad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Figure 5:
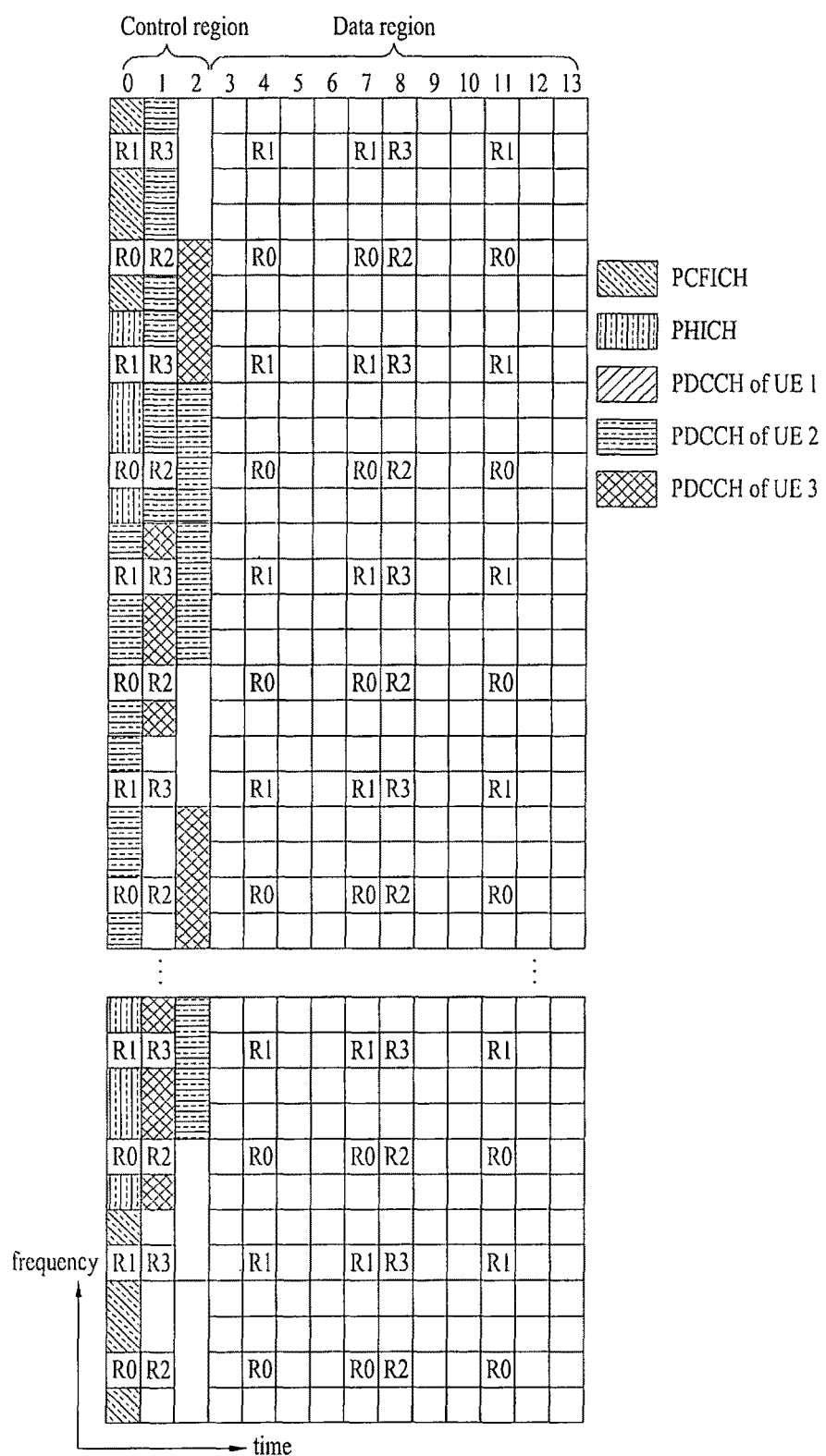
FIG. 5 is a diagram for one example of a structure of a downlink (DL) subframe used by LTE system.

FIG. 5 is a diagram for one example of a control channel included in a control region of one subframe in a downlink (DL) radio subframe.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
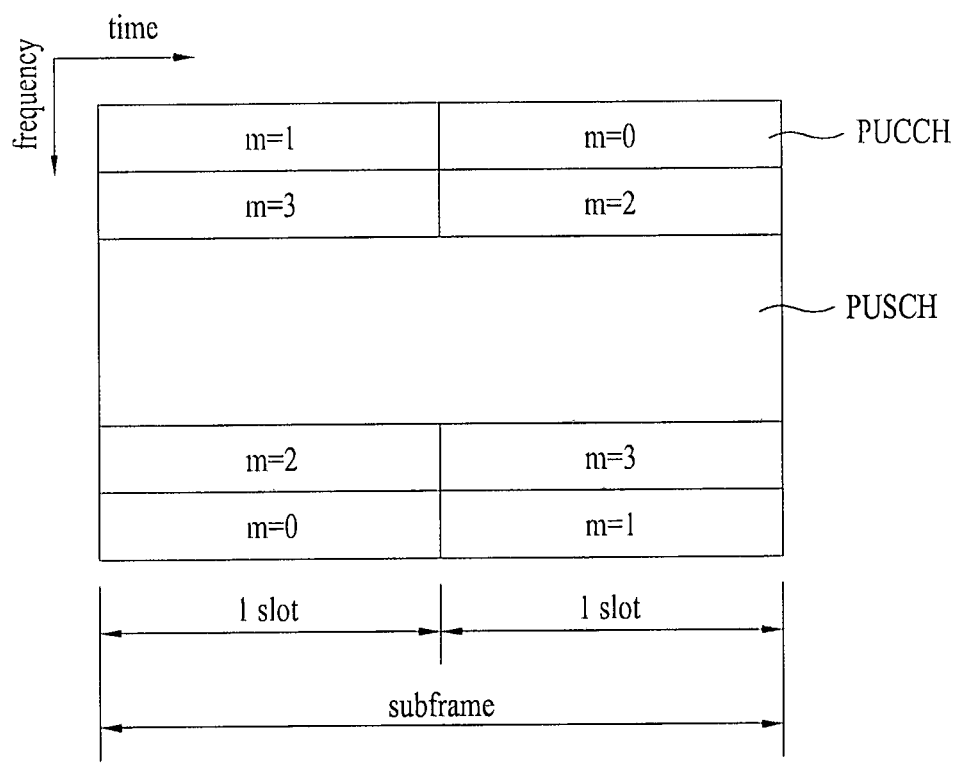
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, reference signals are explained in detail.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called. CSI-RS (channel state information-RS).

Figure 7:
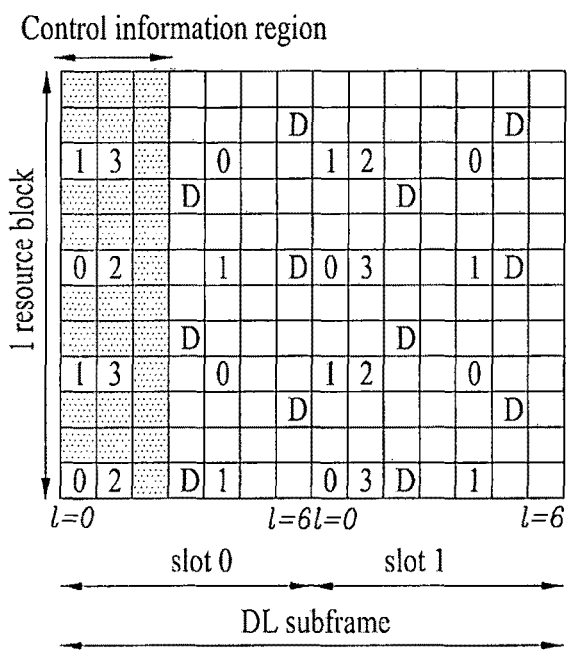
FIG. 7 and FIG. 8 are diagrams for structures of a downlink reference signal in LTE system supportive of a downlink transmission using 4 antennas.
Figure 8:
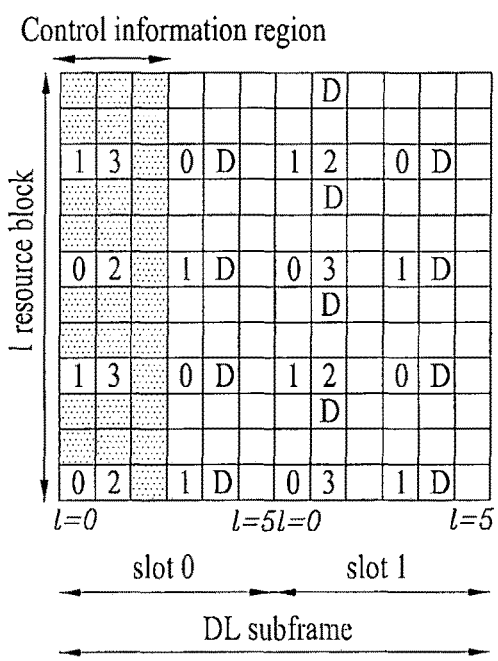

FIG. 7 and FIG. 8 are diagrams for structures of a downlink reference signal in LTE system supportive of a downlink transmission using 4 antennas. Particularly, FIG. 7 shows a case of a normal cyclic prefix and FIG. 8 shows a case of an extended cyclic prefix.

Referring to FIG. 7 and FIG. 8, numerals 0 to 3 entered in a grid correspond to ports 0 to 3 and mean common reference signals (CRS) that are cell-specific reference signals transmitted for channel measurement and data demodulation, respectively. The cell-specific reference signals, CRS, can be transmitted to a user equipment across a control information region and a data information region.

'D' entered in the grid means a downlink DM-RS (demodulation-RS) that is a UE-specific RS. The DM-RS supports a single antenna port transmission on PDSCH. A user equipment receives a signaling of a presence or non-presence of DMRS, which is a UE-specific RS, through an upper layer. FIG. 7 and FIG. 8 show examples of DM-RS corresponding to an antenna port 5. In 3GPP standard document 36.211, DM-RSs for antenna ports 7 to 14, i.e., total 8 antenna ports, are defined as well.

Figure 9:
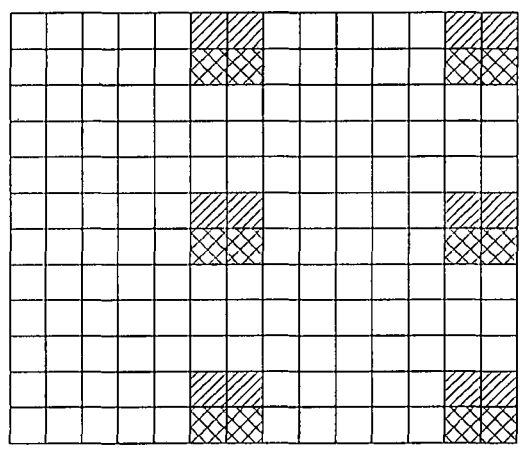
FIG. 9 is a diagram for one example of downlink DM-RS assignment currently defined in 3GPP standard document.

FIG. 9 is a diagram for one example of downlink DM-RS assignment currently defined in 3GPP standard document.

Referring to FIG. 9, DM-RSs corresponding to antenna ports #7, #8, #11 and #13 in DM-RS Group 1 are mapped using a sequence per antenna port. Likewise, DM-RSs corresponding to antenna ports #9, #10, #12 and #14 in DM-RS Group 2 are mapped using a sequence per antenna port.

Aside from CRS, the above-mentioned CSI-RS is proposed for the purpose of channel measurement of PDSCH. Unlike CRS, CSI-RSs can be defined into maximum 32 kinds of different CSI-RS configurations in order to reduce inter-cell interference (ICI) in a multi-cell environment.

CSI-RS configurations differ from each other depending on the number of antenna ports. Between neighboring cells, CSI-RS is configured to be transmitted in a manner of being defined to have a CSI-RS configuration as different as possible. Unlike CRS, CSI-RS supports maximum 8 antenna ports. In 3GPP standard document, total 8 antenna ports including antenna ports 15 to 22 are assigned as antenna ports for CSI-RS. In the following, Table 1 and Table 2 show CSI-RS configurations defined in 3GPP standard document. Particularly, Table 1 show a case of a normal CP and. Table 2 show a case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |

TABLE 2-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 25 | (2, 1) | 1 | | | | |
| 26 | (1, 1) | 1 | | | | |
| 27 | (0, 1) | 1 | | | | |

Figure 10:
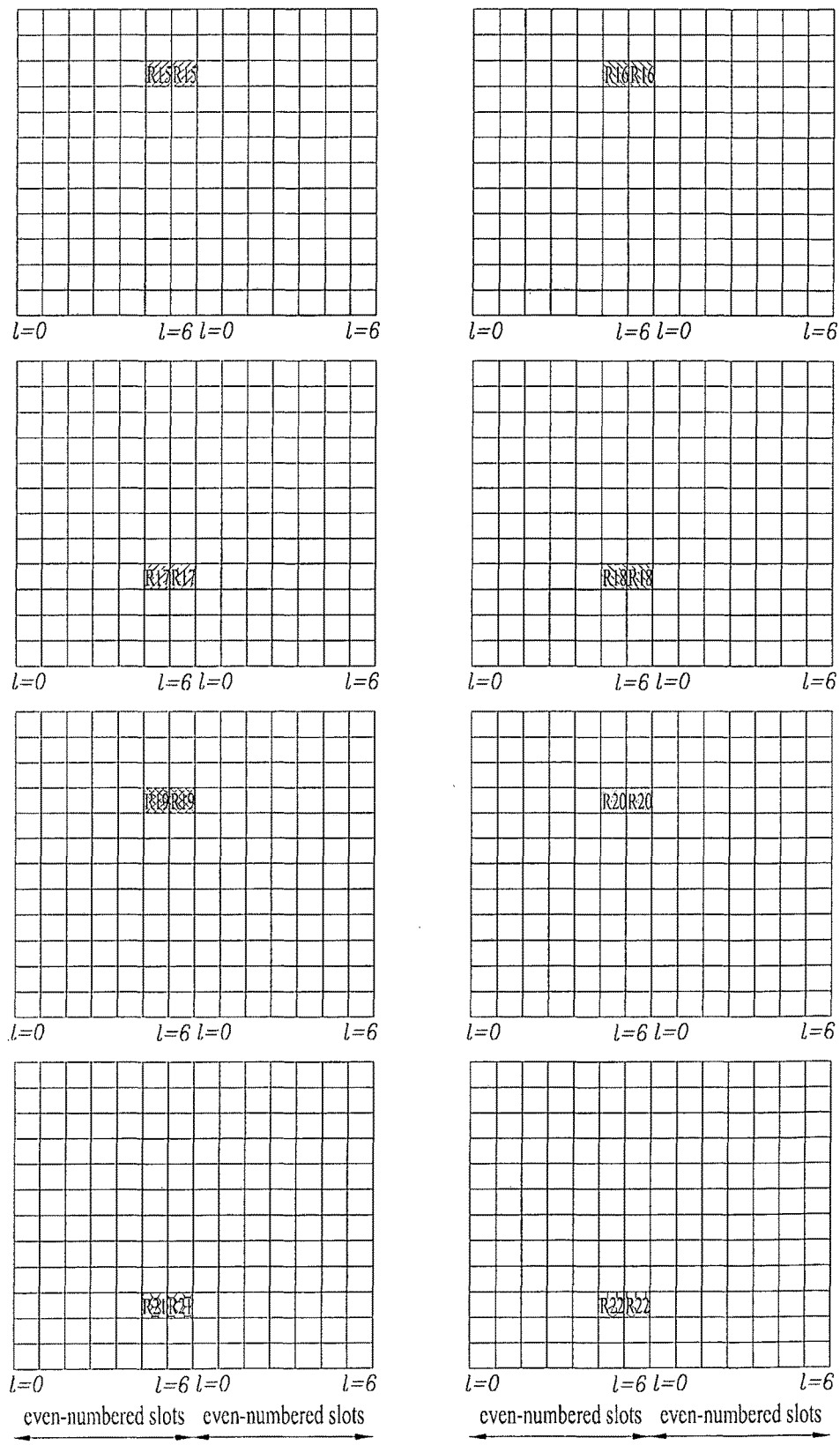
FIG. 10 is a diagram for one example of CSI-RS configuration #0 in case of a normal CP in the downlink CSI-RS configuration currently defined in 3GPP standard document.

In Table 1 and Table 2, (k', l') indicates an RE index, k' indicates a subcarrier index, and l' indicates an OFDM symbol index. FIG. 10 is a diagram for one example of CSI-RS configuration #0 in case of a normal CP in the downlink CSI-RS configuration currently defined in 3GPP standard document.

Moreover, CSI-RS subframe configuration can be defined, which is configured with a periodicity $T_{CSI-RS}$ represented by subframe unit and a subframe offset $\Delta_{CSI-RS}$. Table 3 in the following shows CSI-RS subframe configuration defined in 3GPP standard document.

TABLE 3

| CSI-RS-Sub-frameConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

LTE system is planning to adopt a local area. In particular, in order to reinforce a service support for each user, it is expected to introduce new cell deployment in the concept of a local area access.

Figure 11:
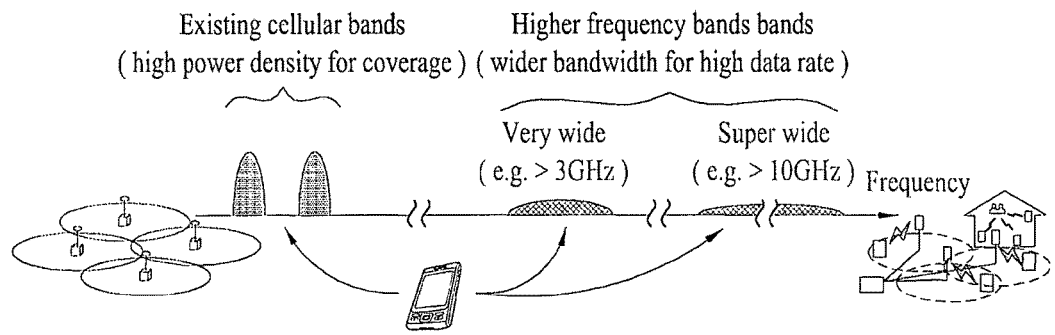
FIG. 11 is a diagram for one example of small-cell concept expected to be introduced into LTE system.

FIG. 11 is a diagram for one example of small-cell concept expected to be introduced into LTE system.

Referring to FIG. 11, a wider system bandwidth is configured on a higher center frequency band, instead of a frequency band operating in the previous LTE system, and may be then operated possibly. Moreover, a basic cell coverage is supported on an existing cellular band based on such a control signal as system information and a wider frequency band is used in a small cell of high frequency, whereby data transmission can be performed by maximizing transmission efficiency. Hence, the concept of a local area access targets low-to-medium mobility user equipments located in a narrower area and may include small cells. And, a distance between a user equipment and a base station in each of the small cells corresponds to 100 m-unit smaller than the km-unit of an existing cell.

In the above-mentioned cells, a distance between a user equipment and a base station decreases and a high frequency band is used, whereby the following channel characteristics can be expected.

First of all, in aspect of delayed spreading, as a distance between a base station and a user equipment decreases, a delay of a signal may decrease. Secondly, in aspect of subcarrier spacing, in case that an OFDM based frame identical to that of LTE system is applied, since an assigned frequency band is relatively wide, the subcarrier spacing may be set to a value extremely greater than 15 kHz. Finally, in aspect of Doppler's frequency, since a high frequency band is used, Doppler's frequency higher than a low frequency band of the same user equipment speed appears. Hence, a coherent time may decrease extremely. In this case, the coherent time means a time interval in which a channel has static or uniform characteristics temporally. A coherent bandwidth means a bandwidth in which a channel has static or uniform characteristics temporally.

Generally, in order to design a reference signal, it is necessary to regulate a target center frequency (fc) and a maximum moving speed of a user equipment. Since a bandwidth size, which is one of major factors, has a relatively small ratio over a center frequency, a representative center frequency per system band can be approximated to an existing center frequency. Actually, although a maximum bandwidth is 20 MHz in LTE system, in order to support a center frequency 2 GHz and a maximum moving sped 580 km/h of a user equipment for a full system band, a reference signal (RS), particularly, a cell-specific reference signal (CRS) is designed. Actually, assuming that a center frequency and a UE's maximum moving speed are 2 GHz and 500 km/h, respectively, maximum Doppler's frequency becomes 1,074 HZ, i.e., about 1,000 Hz.

$$f_d = \frac{v}{c} \times f_c = \frac{(580 \times 10^3)/3600}{3 \times 10^8} \times (2 \times 10^9) = 1074 \text{ Hz} \quad \text{[Formula 9]}$$

Generally, a coherent time can get about 50% from a maximum Doppler's frequency. Hence, in LTE system, the relation shown in Formula 10 can be established.

$$T_C = \frac{1}{2f_d} \cong 0.5 \text{ ms} \quad \text{[Formula 10]}$$

In Formula 10, Tc indicates a coherent time and fd indicates Doppler's frequency. Such a relation may mean that maximum two RSs are necessary within the coherence time. In particular, in LTE system, CRS is designed to maintain density of 4 reference signals on a time axis in 1 ms subframe in order to support UE's moving speed corresponding to Doppler's frequency of about 1,000 Hz.

Yet, for a frequency band having a central frequency amounting to several tens of GHz, a transmission using a bandwidth amounting to several hundreds of MHz or several GHz is considered instead of an existing bandwidth amounting to several tens of MHz. In this situation, a system bandwidth can be calculated as a value that cannot be ignored in consideration of a center frequency. Namely, for instance, if a center frequency and a bandwidth are set to 2 GHz and 20 MHz, respectively, a bandwidth over a center frequency is 1%. Yet, if a center frequency and a bandwidth are set to 10 GHz and 1 GHz, respectively, a bandwidth over a center frequency increases to 10%.

Hence, a user equipment may have a center frequency differing in accordance with a position of a serviced bandwidth. For instance, if a center frequency and a UE's moving speed are set to 10 GHz and 200 km/h, respectively, a maximum Doppler's frequency can be calculated as Formula 11.

$$f_d = \frac{v}{c} \times f_c = \frac{(200 \times 10^3)/3600}{3 \times 10^8} \times (10 \times 10^9) = 1852 \text{ Hz} \quad \text{[Formula 11]}$$

Figure 12:
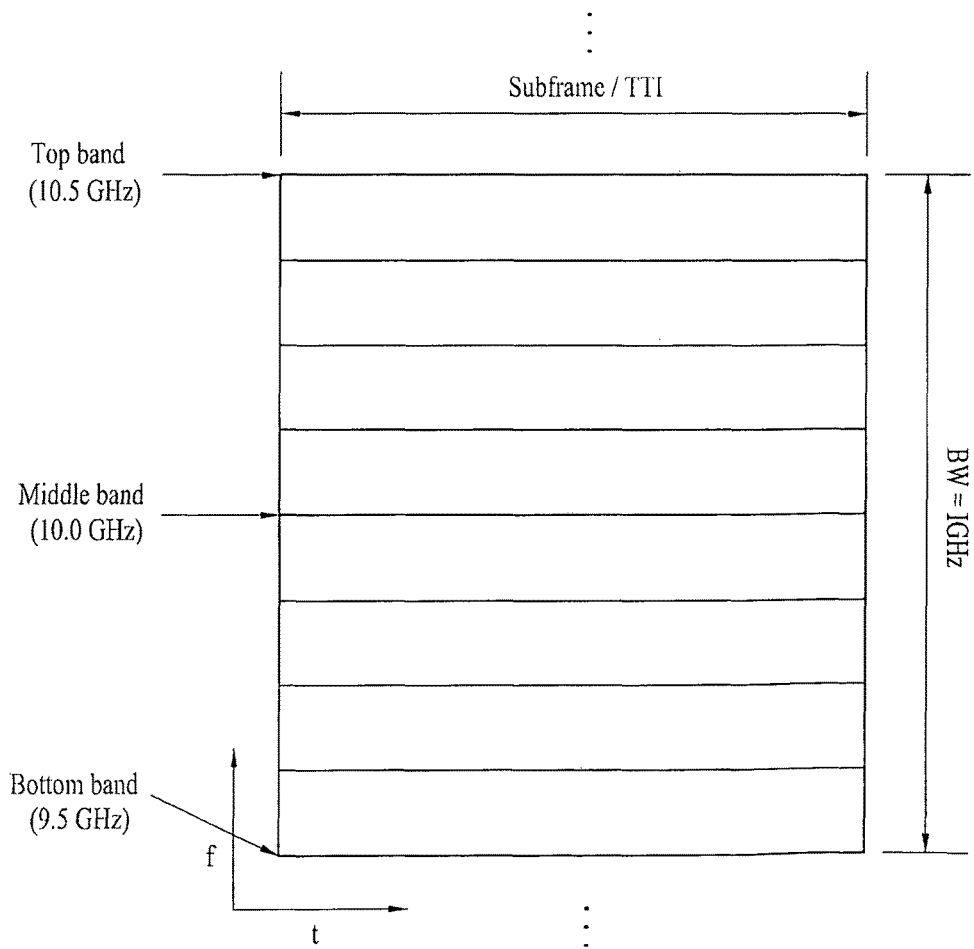
FIG. 12 is a diagram for one example of broadband system bandwidth assignment on a high frequency.

This is described in detail with reference to the accompanying drawing as follows. FIG. 12 is a diagram for one example of broadband system bandwidth assignment on a high frequency. Particularly, in FIG. 12, assume that a system bandwidth and a UE's moving speed are set to 1 GHz and 200 km/h, respectively, under the same center frequency.

Referring to FIG. 12, if Doppler's frequencies at top, middle and bottom within a bandwidth are found as Formulas 12 to 14 in the following. In this case, a center frequency correction value means a bandwidth-added/deducted center frequency of a user equipment at each location.

$$f_d = \frac{v}{c} \times f_c = \quad \text{[Formula 12]}$$
$$\frac{(200 \times 10^3)/3600}{3 \times 10^8} \times (10.5 \times 10^9) = 1944 \text{ Hz -Top}$$

$$f_d = \frac{v}{c} \times f_c = \quad \text{[Formula 13]}$$
$$\frac{(200 \times 10^3)/3600}{3 \times 10^8} \times (10 \times 10^9) = 1852 \text{ Hz -Middle}$$

$$f_d = \frac{v}{c} \times f_c = \quad \text{[Formula 14]}$$
$$\frac{(200 \times 10^3)/3600}{3 \times 10^8} \times (9.5 \times 10^9) = 1759 \text{ Hz -Bottom}$$

Referring to Formulas 12 to 14, it can be observed that a Doppler's frequency difference between top and bottom within a bandwidth increases up to maximum 200 Hz. Coherent times at top, middle and bottom are calculated as Formulas 15 to 17, respectively. Likewise, the meaning of the coherent time means that at least two reference signals are required within each coherent time.

$$T_C = \frac{1}{2f_d} = \frac{1}{2 \times 1944} \cong 0.257 \text{ ms -Top} \quad \text{[Formula 15]}$$

$$T_C = \frac{1}{2f_d} = \frac{1}{2 \times 1852} \cong 0.270 \text{ ms -Middle} \quad \text{[Formula 16]}$$

$$T_C = \frac{1}{2f_d} = \frac{1}{2 \times 1759} \cong 0.284 \text{ ms -Bottom} \quad \text{[Formula 17]}$$

Hence, for accurate channel estimation on a high frequency band, more reference signals are necessary within the same time if a center frequency gets higher. If a center frequency gets lower, the same channel estimation can be achieved using less reference signals. Yet, regarding a reference signal required density difference in accordance with a center frequency negligible in an existing system design, probability of a generation of the density difference within a single system bandwidth increases if a center frequency gets lower and a transmission bandwidth gets wider. Moreover, if a moving speed of a user equipment gets higher, the difference further increases.

For efficient bandwidth management of a system having a wider transmission bandwidth over a center frequency, the present invention proposes a time-axis reference signal pattern design that is variable per band.

1st Embodiment

To solve the above-described problems, a 1st embodiment of the present invention proposes a method of configuring a reference signal pattern differing per partial band on a full frequency band. In particular, reference signals are not configured to have the same density on a full system band but reference signals are configured to differ in density per band.

First of all, after a full transmission band has been divided into N partial bands, each of the partial band is configured to have a different time-axis reference signal density. In particular, centering on a center frequency for a full frequency band, a reference signal pattern of low density is configured on a bottom partial band, while a reference signal pattern of high density is configured on a top partial band.

The 1st embodiment of the present invention is suitable for a communication environment of which transmission band is a broadband with a center frequency of high frequency. In particular, this means the environment in which a size a transmission band over a center frequency increases up to a significant value greater than a reference value in accordance with a location at which a resource is allocated to a user equipment. In this case, since a coherent time attributed to a center frequency and a moving speed of a user equipment varies for each partial band, the coherent time is derived with reference to different center frequency values and a reference signal pattern is configured. This is to support the UE's moving speed that is the same system requirement for the whole band.

Figure 13:
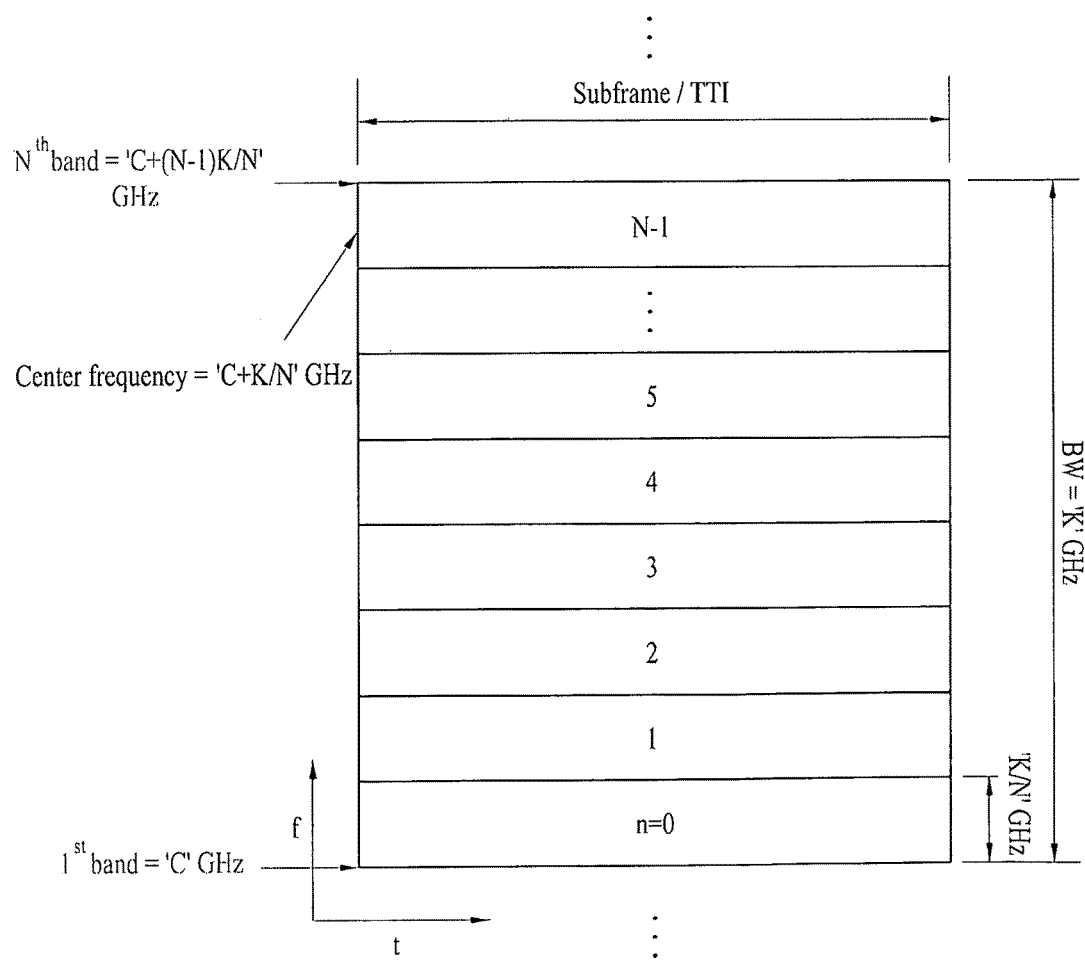
FIG. 13 is a diagram for one example of reference center frequency configuration for each of N partial bands according to a 1st embodiment of the present invention.

FIG. 13 is a diagram for one example of reference center frequency configuration for each of N partial bands according to a 1st embodiment of the present invention. Particularly, in case of FIG. 13, a full system band having a bandwidth of K Hz is divided into N partial bands. In this case, a reference center frequency for each partial band can be represented as Table 4 in the following.

TABLE 4

| Partial band | Reference center frequency | Time-axis reference signal density (maximum L per TTI) |
|---|---|---|
| 0 | C | $L_0$ |
| 1 | C + K/N | $L_1$ |
| 2 | C + 2K/N | $L_0$ |
| . | . | . |
| . | . | . |
| . | . | . |
| N − 1 | C + (N − 1)K/N | $L_{N-1}$ |

In Table 4, it is able to calculate a coherent time for each partial band using a modified center frequency. And, it is able to configure reference signals using the calculated coherent times in a manner that each of the partial bands has a different reference signal density. The reference signal density (RS density) required for each partial band can be defined as Formula 18 in the following.

$$Requied\ RS\ density = \left\lceil \frac{TTI}{T_C} \right\rceil \times (\text{the numder of required } RSs)$$ [Formula 18]

Since a reference center frequency increases in proportion to an increase of a partial band index in FIG. 13 and Table 4, a coherent time gets shorter but a time-axis reference signal density required for accurate channel estimation increases within the same TTI (transmission time interval).

Figure 14:
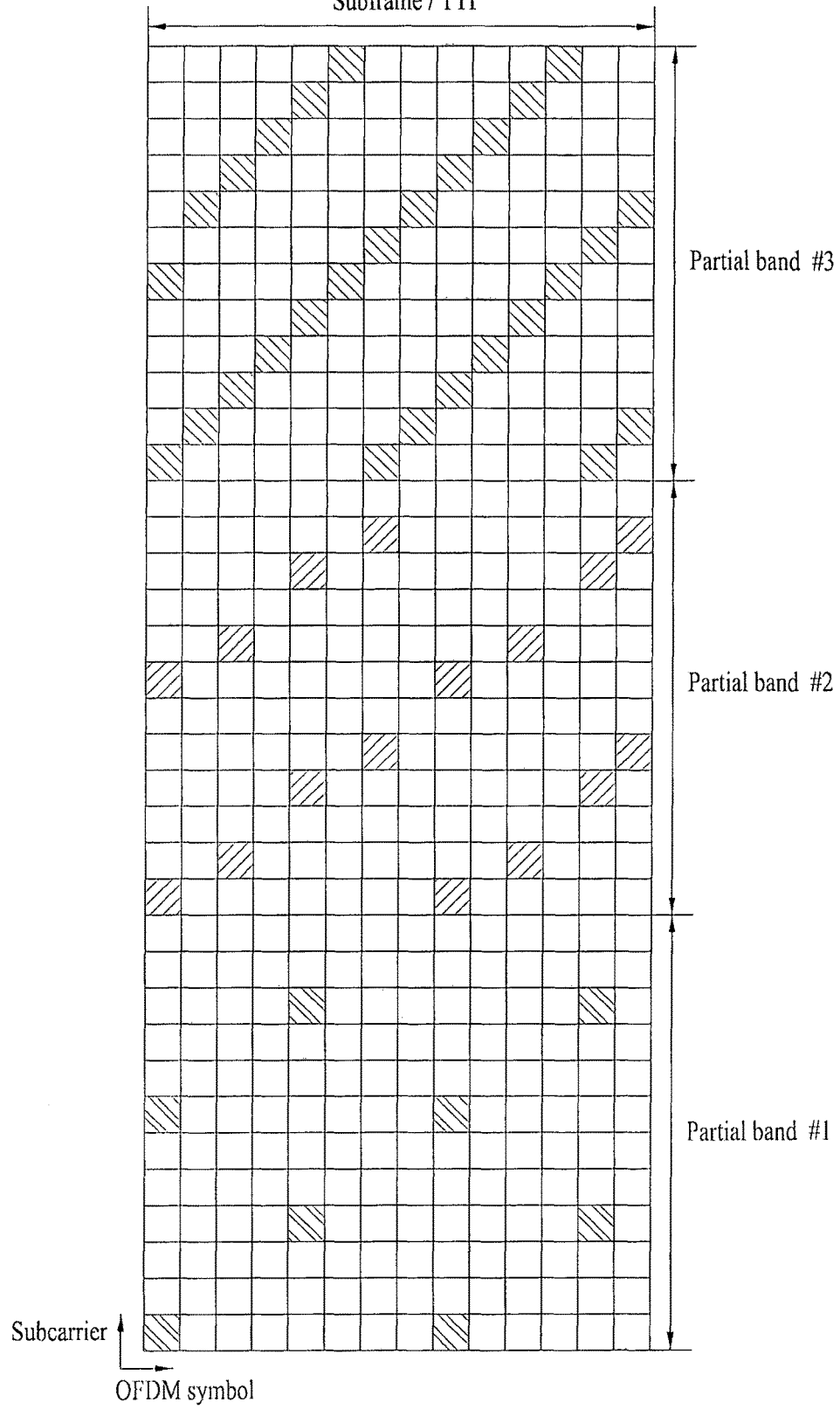
FIG. 14 is a diagram for one example of assigning a time-axis reference signal pattern of different density for each partial band according to a 1st embodiment of the present invention.

FIG. 14 is a diagram for one example of assigning a time-axis reference signal pattern of different density for each partial band according to a 1st embodiment of the present invention. Particularly, in FIG. 14, assume that the total number of partial bands is 3 and that reference signal densities required for the partial bands are set to values different from each other by 1 time, 2 times and 3 times, respectively. Yet, assume that a frequency-axis reference signal density is set equal for each partial band.

Of course, in aspect of a user equipment, it is necessary to be equipped with channel estimators corresponding to the number of partial bands differing from each other in a reference signal pattern.

2nd Embodiment

According to a 2nd embodiment, a following method is proposed. First of all, the same reference signal density is maintained for a full bandwidth. Secondly, a low frequency band over a center frequency, i.e., a bottom band, is preferentially assigned to a user equipment that is moving faster. Thirdly, a high frequency band over a center frequency, i.e., a top band, is preferentially assigned to a user equipment that is moving relatively slow.

In particular, in case that the same reference signal density is maintained for a full band, a base station preferentially assigns a bottom band, of which reference center frequency is low, in case of resource allocation to a user equipment. This is a scheduling method for securing channel estimation performance on a moving speed of a user equipment as far as possible. On the other hand, if a moving speed of a user equipment is low or a user equipment is in a static situation, a top band is preferentially assigned. This is attributed to the following reason. First of all, even if a reference center frequency gets higher, when a moving sped of a user equipment is low, Doppler's frequency gets lower but a coherent time gets longer. Hence, a reference signal density required within the same TTI is decreased.

3rd Embodiment

Meanwhile, a 3rd embodiment of the present invention proposes a method of flexibly configuring a reference signal pattern for each band per TTI/subframe/system frame.

Particularly, in managing and operating a subframe having a reference signal pattern differing on each partial band in density like the 1st embodiment, a predetermined pattern or periodicity is configured and managed. In more particular, instead of applying the same subframe configuration to every TTI or subframe all the time, it is possible to apply a flexible frame in a manner of transmitting subframe configuration/reconfiguration information to a user equipment by dynamic signaling or upper layer signaling such as RRC signaling. A base station can maximize a gain of a system by adjusting a rate of a subframe, in which a specific reference signal is transmitted, in accordance with a communication situation within a corresponding service coverage.

In particular, a subframe/TTI structure having a different reference signal pattern is shared by a user equipment and a base station. The base station can transmit a specific subframe triggered location or a subframe index information to the user equipment. This is described in detail with reference to the accompanying drawing.

Figure 15:
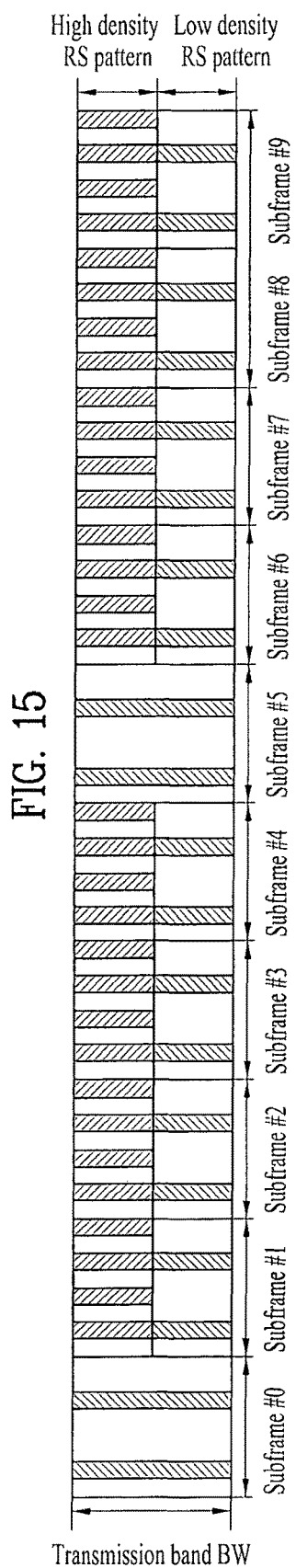
FIG. 15 is a diagram for one example of applying a reference signal pattern differing for each subframe according to a 3rd embodiment of the present invention.

FIG. 15 is a diagram for one example of applying a reference signal pattern differing for each subframe according to a 3rd embodiment of the present invention. Particularly, in FIG. 15, assume that a frame having reference signal densities of two types exist. And, assume that this intra-subframe reference signal configuration is already known to a base station and a user equipment.

Referring to FIG. 15, it can be observed that a base station determines a situation of a user equipment within a service coverage and then changes a frame configuration. In particular, if a high-speed user equipment and a low-speed user equipment coexist in the service coverage, a reference signal pattern of subframes #1 to #4 and a reference signal pattern of subframes #6 to #9, as shown in FIG. 15, are assigned. Yet, if the number of the low-speed user equipments absolutely dominates over that of the high-speed user equipments in the service coverage, subframes #0 and #5 configured as a pattern of a low reference signal density are assigned.

In doing so, the rate of partial bands differing from each other in reference signal density of each frame can be extremely adjusted. And, a frame can be configured to have a specific reference signal density only.

In addition, in configuring a subframe, a base statin can transmit a corresponding information to a user equipment. For instance, if a single system frame consists of 10 subframes, as shown in FIG. 15, a subframe information configured with a single reference signal density can be transmitted to the user equipment in a manner of being configured as a bitmap such as '1000010000'. On the contrary, in case of generating a system information centering on a subframe information configured with multiple reference signal densities, the system information can be transmitted to the user equipment in a manner of being configured as a bitmap such as '0111101111'.

In configuring multi-RS density subframe/TTI, it is able to define a corresponding rate in advance. Yet, the rate can be flexibly set through RRC signaling. In doing so, the base statin can decide a ratio of a low-density reference signal pattern applied band to a high-density reference signal pattern applied band by determining moving situations of user equipments.

Finally, the user equipment should be provided with a channel estimator appropriate for each subframe in accordance with the subframe configuration information delivered from the base station or can activate and deactivate the channel estimator. For instance, the user equipment should perform channel estimation using a single channel estimator in the single reference signal density subframe. And, the user equipment should activate channel estimators corresponding to the number of different RS density partial bands in multi-RS density subframe.

In the above description, the method of configuring and applying a reference signal appropriate for a communication environment that uses a broadband on a high frequency band is explained. And, it is a matter of course that the same method is applicable to a small cell as well as to an existing macro cell.

Figure 16:
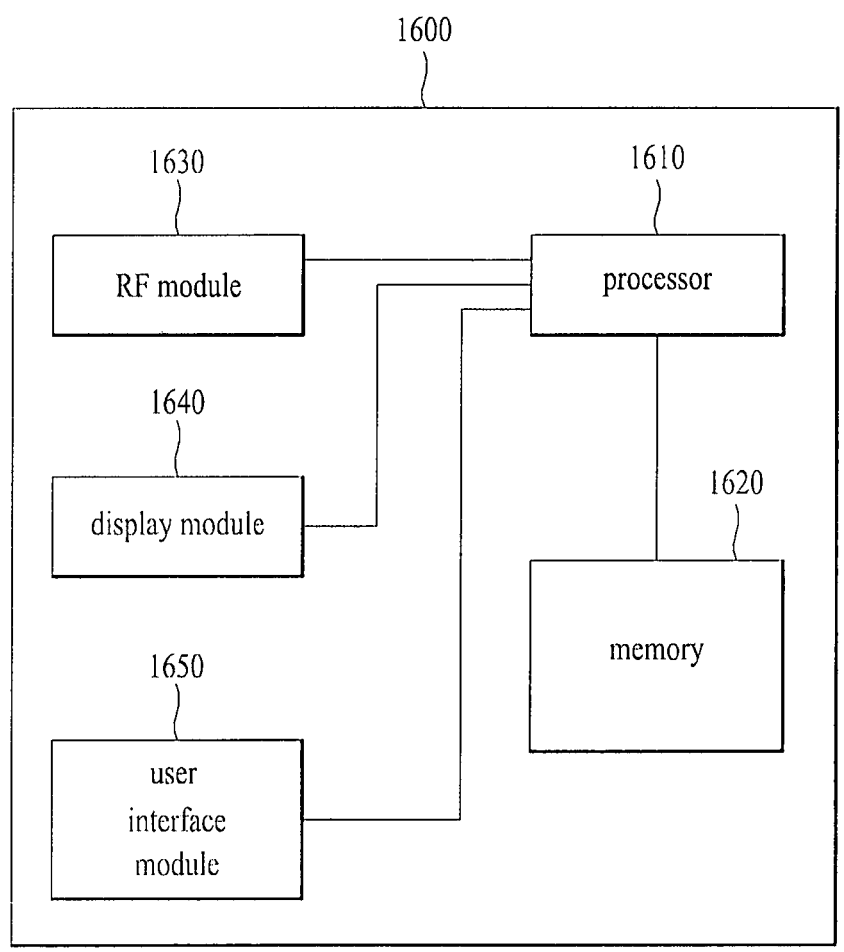
FIG. 16 is a block diagram for one example of a communication device according to one embodiment of the present invention.

FIG. 16 is a block diagram for one example of a communication device according to one embodiment of the present invention.

Referring to FIG. 16, a communication device 1600 includes a processor 1610, a memory 1620, an RF module 1630, a display module 1640 and a user interface module 1650.

The communication device 1600 is illustrated for clarity and convenience of the description and some modules can be omitted. Moreover, the communication device 1600 is able to further include at least one necessary module. And, some modules of the communication device 1600 can be further divided into sub-modules. The processor 1610 is configured to perform operations according to the embodiment of the present invention exemplarily described with reference to the accompanying drawings. In particular, the detailed operations of the processor 1610 can refer to the contents described with reference to FIGS. 1 to 15.

The memory 1620 is connected to the processor 1610 and stores operating systems, applications, program codes, data and the like. The RF module 1630 is connected to the processor 1610 and performs a function of converting a baseband signal to a radio signal or converting a radio signal to a baseband signal. For this, the RF module 1630 performs analog conversion, amplification, filtering and frequency uplink transform or inverse processes thereof. The display module 1640 is connected to the processor 1610 and displays various kinds of informations. The display module 1640 can include such a well-known element as LCD (Liquid Crystal Display), LED (Light Emitting Diode), OLED (Organic Light Emitting Diode) and the like, by which the present invention is non-limited. The user interface module 1650 is connected to the processor 1610 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a reference signal from a base station to a user equipment in a wireless communication system and apparatus therefor are described mainly with reference to examples applied to 3GPP LTE system, as mentioned in the foregoing description, the present invention is applicable to various kinds of wireless communication systems as well as the 3GPP LTE system.

The invention claimed is:

1. A method of transmitting a reference signal to a user equipment by a base station in a wireless communication system, the method comprising:
configuring reference signals for subframes included in a system frame;
transmitting subframe configuration information including information on the reference signals to the user equipment;
and transmitting the configured reference signals to the user equipment, wherein the reference signals comprise a first reference signal having a time-axis high density and second reference signal having a time-axis low density,
wherein the system frame comprises a $1^{st}$ subframe type having both the first reference signal and the second reference signal and a $2^{nd}$ subframe type having the second reference signal only,
wherein, in the $1^{st}$ subframe type, the first reference signal is configured on a high frequency partial band with reference to a center frequency of a system band and the second reference signal is configured on a low frequency partial band with reference to the center frequency,
and wherein, in the $2^{nd}$ subframe type, the second reference signal is configured across the system band.

2. The method of claim 1, wherein the subframe configuration information is defined as a bitmap by unit of the system frame including a predetermined number of subframes.

3. The method of claim 1, wherein configuring the reference signals comprises:
if a high-speed user equipment and a low-speed user equipment coexist in a coverage, configuring the first reference signal and the second reference signal on the high frequency partial band and the low frequency partial band, respectively; and if the low-speed user equipment exists and the high-speed user equipment does not exist in the coverage, configuring the second reference signal across the system band.

4. The method of claim 1, wherein a frequency-axis density of the first reference signal is equal to the frequency-axis density of the second reference signal.

5. A base station in a wireless communication system, the base station comprising:
- a processor for configuring reference signals for subframes included in a system frame;
- and a transmitter for transmitting subframe configuration information including information on the reference signals to the user equipment and transmitting the configured reference signals to a user equipment,
- wherein the reference signals comprise a first reference signal having a time-axis high density and a second reference signal having a time-axis low density,
- wherein the system frame comprises a $1^{st}$ subframe type having both the first reference signal and the second reference signal and a 2nds subframe type having the second reference signal only,
- wherein, in the $1^{st}$ subframe type, the first reference signal is configured on a high frequency partial band with reference to a center frequency of a system band and the second reference signal is configured on a low frequency partial band with reference to the center frequency,
- and wherein, in the $2^{nd}$ subframe type, the second reference signal is configured across the system band.

6. The base station of claim 5, wherein the subframe configuration information is defined as a bitmap by unit of the system frame including a predetermined number of subframes.

7. The base station of claim 5, wherein if a high-speed user equipment and a low-speed user equipment coexist in a coverage, the processor configures the first reference signal and the second reference signal on the high frequency partial band and the low frequency partial band, respectively and
- wherein if the low-speed user equipment exists and the high-speed user equipment does not exist in the coverage, the processor configures the second reference signal across the system band.

8. The base station of claim 5, wherein a frequency-axis density of the first reference signal is equal to the frequency-axis density of the second reference signal.

* * * * *